United States Patent [19]
Ross et al.

[11] 3,965,537
[45] June 29, 1976

[54] SHIRRED COLLAGEN CASING STICK HAVING AN END CLOSURE AND METHOD OF MAKING THE SAME

[75] Inventors: Camilla B. Ross, Hinsdale; Jerry A. Vos, Tinley Park, both of Ill.

[73] Assignee: Union Carbide Corporation, New York, N.Y.

[22] Filed: Mar. 26, 1975

[21] Appl. No.: 562,010

[52] U.S. Cl. .................................. 17/42; 17/33; 99/450.6
[51] Int. Cl.² .................................. A22C 11/02
[58] Field of Search ............. 17/33, 34, 42; 99/18, 99/109, 176

[56] References Cited
UNITED STATES PATENTS

| | | | |
|---|---|---|---|
| 2,704,259 | 3/1955 | Lamb | 99/176 |
| 3,446,634 | 5/1969 | Stahlberger | 99/176 |
| 3,529,530 | 9/1970 | Tsuzuki | 99/18 |
| 3,560,223 | 2/1971 | Turbak | 99/109 |

FOREIGN PATENTS OR APPLICATIONS

| | | |
|---|---|---|
| 1,219,463 | 1/1971 | United Kingdom |
| 1,273,610 | 5/1972 | United Kingdom |

*Primary Examiner*—Louis G. Mancene
*Assistant Examiner*—Robert F. Cutting
*Attorney, Agent, or Firm*—Franklyn Schoenberg

[57] ABSTRACT

A stick of shirred edible tubular food casing having an end closure comprising casing material defining an end of said shirred casing having the opposing internal surfaces thereof joined across the full width thereof obliquely to the longitudinal edges of said tubular casing, the end closure formed thereby being suitable to block the passage of food emulsion from the end of said tubular food casing.

Also provided is a method for heat sealing edible, water-insoluble food casing material which comprises moisturizing at least a portion of one opposing surface of superimposed plies of edible, water-insoluble food casing material to be joined and then imposing heat sealing means with sufficient heat and pressure on the superimposed plies of casing material to join the opposing surfaces thereof together.

19 Claims, 3 Drawing Figures

SHIRRED COLLAGEN CASING STICK HAVING AN END CLOSURE AND METHOD OF MAKING THE SAME

The present invention relates to edible food casings and, more particularly, to shirred tubular food casings of edible tubular materials having an end closure and to methods of making the same.

Thin-wall, flexible tubing prepared from material such as collagen, cellulosic materials, starches, alginates and the like are used extensively as food casings in the preparation of a wide variety of processed food products. Tubular casings used for small sized sausage meat products such as frankfurters and the like are generally supplied in the form known in the art as "shirred casing sticks" wherein continuous lengths of tubing ranging from about 30–160 feet or more are shirred and compressed into a tubular stick of from about 7 inches to 27 inches in length.

Automated stuffing and linking apparatus are widely used in the preparation of sausage meat products such as frankfurters substantially eliminating many of the time consuming and expensive manual operations heretofore employed and the use of shirred casing sticks of regenerated cellulose food casing has played a significant role in automated processing. For example, in a typical automatic frankfurter stuffing procedure, employing a machine as, for example, disclosed in U.S. Pat. No. 3,115,668 to Townsend, a plurality of shirred casing sticks are placed in a dispensing hopper from which the shirred sticks are successively dispensed for mounting on the stuffing horn and associated linking apparatus. Food product dispensed from the stuffing horn into the casing deshirrs and advances the casing as the stuffed casing is linked into the desired size and shape of product.

In keeping with automation of the casing stuffing operation, the shirred regenerated cellulose casing sticks are preferably supplied with an end closure or plug that will effectively block the flow of food emulsion from the end of the casing and, thereby, initiate filling and deshirring of the casing stick. A number of suitable end closures for shirred regenerated cellulose casing sticks and methods of preparing the same are disclosed, for example, in U.S. Pat. Nos. 3,162,893 to Townsend, U.S. Pat. 3,274,005 to Alsys, 3,383,222 to Alsys et al. and 3,419,401 to Matecki.

Sausage product such as pork sausages, however, are generally prepared with edible food casings prepared from materials such as collagen. Heretofore, the preparation of pork sausages has not been as highly automated as the manufacture of frankfurters and while the collagen casings employed are most advantageously supplied in the form of a shirred casing stick, such sticks are generally not provided with preformed end closures. Recently, interest in using edible collagen food casing in the preparation of frankfurters and/or with highly automated stuffing and linking equipment has been growing. Preparation of shirred collagen casing sticks with a suitable preformed end closure, accordingly, would be desirable to attain advantages similar to those obtained with cellulosic food casings.

It is well known in the art that many of the characteristics of tubular collagen casings, as, for example, physical strength and flexibility, are different from those of the cellulosic casings. The known type of end closures may, therefore, not be equally suitable for use with collagen casings. Furthermore, the known types of end closures, while exhibiting many advantages over manually formed closures, have been found to have certain limitations such as, for example, difficulty in controlling the amount of casing used in forming the end closure.

Whereas regenerated cellulose and collagen materials are most widely used in the preparation of tubular food casings, other artificial materials such as various plastic films have been suggested as being suitable for special applications and, as disclosed, for example, in U.S. Pat. No. 3,560,223, a preformed end closure for the tubular casing may also be employed.

In accordance with the present invention, there is provided a stick of shirred edible tubular food casing having an end closure, said end closure comprising casing material defining an end of said shirred tubular casing having the opposing internal surfaces thereof joined and preferably heat sealed across the full width of said tubular casing obliquely to the longitudinal edges thereof, said closure being suitable to block the passage of food product from the end thereof. It has been discovered that the end closure of the present invention may be readily formed from a controlled, minimum amount of casing material and effectively blocks the passage of food emulsion dispensed by automatic stuffing machines without damage to or distortion of the tubular casing.

Also provided in accordance with the present invention is a method for heat sealing edible, water-insoluble food casing material to form, for example, an end closure for a shirred stick of edible tubular food casing. The method comprises moisturizing at least a portion of one opposing surface of multi-ply-layers of edible casing material in the area to be joined and then imposing sufficient heat and pressure to said multi-ply layers of casing material to join together the opposing superimposed surfaces thereof. In an embodiment of the invention where an end closure for an edible, tubular food casing is formed, the heat sealing means is imposed across the full flattened width of said tubular food casing, preferably obliquely to the longitudinal edges of said tubing. Excess casing material extending from the edge of the heat sealed plies will be severed therefrom and discarded. In alternate embodiments of the invention, edible, water-insoluble casing material to be heat sealed, as, for example, a tubular food casing, may be moisturized by any means well known in the art to a moisture content of at least about 15% by weight prior to forming an end closure therefor, thereby providing the opposing surfaces of casing material to be heat sealed with the desired moisturization.

The advantages of the present invention will be more fully appreciated and the invention will be better understood from the following description when considered in conjunction with the accompanying drawing wherein.

Figure 1:
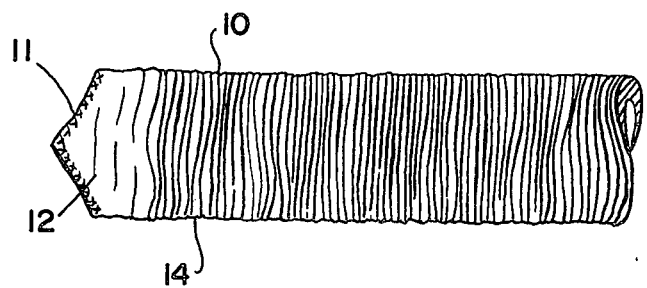
FIG. 1 is a plan view of an embodiment of the present invention showing a portion of a shirred casing having an end closure of the invention.

Turning now to the drawing wherein like reference numerals denote like parts, there is shown in FIG. 1 an exemplary embodiment of a shirred casing stick 10 of edible tubular casing material having a heat sealed end closure 11 wherein the casing material 12 defining an end of the shirred tubular casing is joined across the full width of the tubing obliquely to the longitudinal edges 14 thereof. In the embodiment shown, the end closure 11 is in the form of an obtuse V of about 120°. The excess casing material beyond the joined edges of the casing has been removed to leave a relatively clean edge and thereby avoiding any possible interferences with the operation of known stuffing and/or linking apparatus.

Edible tubular casing material suitable for use in the shirred casing stick of the present invention may be an edible food casing material and preferably food casing prepared from collagen that is, in general, water-insoluble and the surfaces of which may be joined by the use of heat and pressure without unduly distorting or otherwise damaging the casing material.

Suitable collagen casing material may be prepared by any one of a wide variety of methods known in the art including, for example, the methods disclosed in U.S. Pat. Nos. 3,123,482 and 3,413,129 to Lieberman and U.S. Pat. Nos. 3,551,535 and 3,782,977 to Henderson et al.

Shirred casing sticks of the invention may be prepared using methods and apparatus well known in the art as disclosed, for example, in U.S. Pat. Nos. 2,983,949 and 2,984,574 to Matecki, 3,110,058 and 3,158,896 to Marbach, and 3,704,483 to Urbutis et al.

While it is especially important that the end closure be strong enough to block passage of food emulsion from the end of this shirred casing, it is also quite important that neither the tubular casing nor the end closure formed therein should be distorted or otherwise damaged by the stuffing pressure of the food emulsion or by the operation of the stuffing and/or linking apparatus. It has been found that when the end of the casing is closed off by joining the flattened plies of casing perpendicular to the longitudinal edges thereof, the food emulsion stuffing pressure causes the tubular casing adjacent to the end closure to balloon out with breakage of the casing resulting. The end closure of the invention, wherein the seal formed across the end of the casing is oblique to the longitudinal edges of the tubular casing, has been found to overcome this problem without any reduction in the ability to restrain the flow of food emulsion.

It has also been found that when excess casing material beyond the end closure is not removed, the loose tab of casing material may interfere with operation of the apparatus or may be caught up by the mechanism and results in either breakage of the casing or premature deshirring.

The angles formed between the end closure of the invention and longitudinal edges of the tubular casing are oblique angles that may vary relatively widely in size. In general, however, the end closure should form at least one internal obtuse angle with the longitudinal edges of the casing, and preferably, at least one internal obtuse angle of between about 120° and 150°.

Figure 2A:
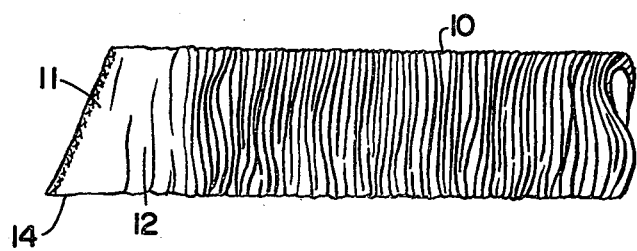
FIG. 2A is a plan view of an embodiment of the casing end closure of the invention.
Figure 2B:
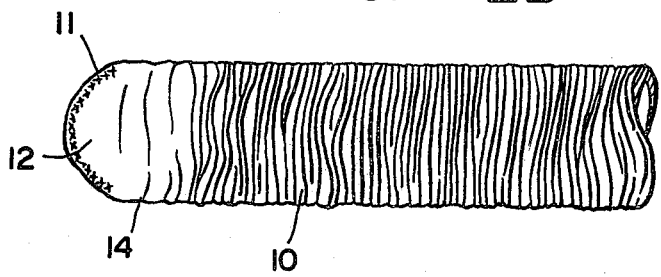
FIG. 2B is a plan view of an alternate embodiment of the casing end closure of the invention.

Referring now to FIGS. 2A and 2B wherein there are illustrated alternate embodiments of the end closure, in FIG. 2A is shown a shirred casing stick 10 of edible tubular casing material 12 having a heat sealed end closure 11 extending diagonally across the width of the tubular casing material 12 at an angle of about 30° to 45° from the casing edge. In FIG. 2B is shown a shirred casing stick 10 of edible tubular casing material 12 having an arcuate shaped end closure 11 where the casing material 12 defining an end thereof is sealed across the full width of the tubular casing.

The end closure of the invention may be formed by any method that may be suitable for joining the opposing internal surfaces of the ends of a tubular casing material. Moreover, the end closure formed in the end of a shirred casing stick may, in general, be readily formed in shirred casing sticks prepared from tubular casing of varying diameter and wall thickness on any of the shirring machines well known in the art or on any suitable support means separate from a shirring machine.

Preferably, the end closure of the invention is formed by heat sealing the ends of the tubular casing material using heat sealing means well known in the art that will provide sufficient heat and pressure to join the opposing internal surfaces of the tubular casing without unduly distorting or causing deterioration of the casing material. Especially advantageous are heat sealing means that will join the surface of the casing material and sever the tab material extending from the sealed edge, but, of course, the tab material may be severed subsequent to forming the heat sealed end.

It has been discovered in accordance with the present invention that edible water-insoluble casing material may be readily heat sealed to join the surfaces thereof into a seal having sufficient strength to withstand forces encountered in a number of applications, as, for example, the pressures exerted by apparatus used to stuff tubular food casing with a food emulsion.

In one embodiment of the invention, superimposed plies of edible, water-insoluble food casing material as, for example, prepared from collagen, may be heat sealed and joined with a strong sealed edge by moisturizing at least one of the opposing surfaces of the superimposed plies of material to be joined and then applying heat and pressure to seal the surfaces of the plies of material together.

The amount of heat and pressure required to afford the desired heat sealing may vary over a wide range but, in general, a temperature of at least about 100°F. should be used while employing a pressure of at least about 80 psig. The time required to attain the desired seal strength is usually quite short, generally less than about 15 seconds. In any event, the temperature employed to form the heat seal should not be so great as to cause deterioration of the materials being joined or of the sealed joint itself.

Alternatively, the end portion of edible water-insoluble casing material to be heat sealed or the entire length of tubular casing may be uniformly moisturized to a moisture content of at least about 15% by weight, in which event opposing surfaces of the casing can be readily heat sealed, as herein described, without the need for further moisturization of the surfaces to be joined.

The following examples are illustrative of the practices of the invention but they are not to be construed as in any way limitative since various modifications can be made in light of the guiding principles and teachings disclosed herein.

EXAMPLE I

A VISTEN Tray Pack Heat Sealer having means of varying heat, pressure and time cycle was employed in this example. The sealer uses an air cylinder pressure means to control the force exerted on the material to be heat sealed by the sealing bar and a variable temperature controlling device for varying the temperature of the sealing bar.

Samples of shirred edible, water-insoluble collagen food casing were prepared from tubular collagen casing prepared in accordance with the method disclosed in U.S. Pat. No. 3,782,977. The tubular casing had a diameter of 28 mm and wall thickness of about 35 microns.

Two shirred casing sticks were prepared with end closures by transversely sealing the casing material at one end of the stick perpendicular to the longitudinal edges of the tubular casing. The sealed end closures were formed by heat sealing at a temperature of about 125°F. and a pressure of about 80 psig, the heat sealing apparatus being activated for two cycles of about 4.6 seconds each with a 6 second interval therebetween.

Two shirred casing sticks were prepared with end closures by diagonally sealing the casing material at one end of the shirred casing stick across the full width thereof using the same sealing cycle described above. A diagonal seal was formed at an angle of about 45° from the longitudinal edges of the tubular casing. The unsealed, tab end of casing material extending beyond the sealed edge was not removed.

The samples of shirred collagen casing with heat sealed end closures were mounted on a frankfurter stuffing and linking machine such as disclosed in U.S. Pat. No. 3,115,668 and then stuffed with a frankfurter meat emulsion.

All end closures satisfactorily blocked the flow of food emulsion from the end of the casing. However, the samples of casing with the perpendicular end closures were found to bulge in the section of casing adjacent to the end closure and each of the casings broke when inserted into the linking apparatus. The casing sticks prepared with diagonal heat sealed end closures blocked the flow of meat emulsion and exhibited no deleterious bulging adjacent the end closure but the loose tab end of casing extending from the sealed edge was caught up by the linking mechanism which resulted in some premature deshirring of the shirred casing.

EXAMPLE II

The heat sealing mechanism and procedures of Example I are used in preparing the sample of this Example. Shirred collagen casing samples of the type described in Example I are used in this Example.

Shirred casing samples are prepared with a heat sealed end closure in the form of an obtuse angle of about 120° and with excess casing material removed from the end thereof as shown in FIG. 1, and perform satisfactorily on stuffing and linking apparatus in the preparation of a string of frankfurters.

EXAMPLE III

The heat sealing apparatus of Example I was used in this Example. Twelve to eighteen inch long samples of unshirred tubular collagen casing prepared as described in Example I were used in this Example. The diameter and wall thickness of the casing samples are reported in Table I.

Collagen casing samples were humidified with air at three different relative humidity levels for the time necessary to obtain casing with different equilibrated moisture contents. The moisture contents of the casing for the three sets of samples were measured and each set of samples was then heat sealed at a temperature of about 125°F. and pressure of about 80 psig using the two cycle procedure of Example I. The heat sealed samples were cooled and then inflated with air to determine the burst pressure of the seal. A summary of the results obtained is reported in Table 1 below.

TABLE 1

| Moisture Content (% by weight) | Casing Sample Diameter (mm) | Wall Thickness (microns) | Seal Burst Pressure (mm Hg) | Casing Burst Pressure (mm Hg) | Seal Burst Pressure (% of Casing Burst Pressure) |
| --- | --- | --- | --- | --- | --- |
| 9.5 | 21 | 26 | 111 | 423 | 26 |
| 15.5 | 21 | 26 | 164 | 423 | 39 |
| 17.0 | 28 | 35 | 519 | 533 | 97 |

In all cases, the samples failed by separation of joined plies of casing material. The substantial increase in strength of the heat sealed end closure formed in collagen casing material having a moisture content greater than about 15% is readily apparent from the results reported in Table 1.

What is claimed is:

1. A stick of shirred edible tubular food casing having an end closure, said end closure comprising casing material defining an end of said shirred tubular casing having the opposing internal surfaces thereof joined across the full width of said tubular casing obliquely to the longitudinal edges thereof, said end closure being suitable to block the passage of food emulsion from the end of said tubular casing.

2. A shirred casing stick as claimed in claim 1 wherein said edible tubular food casing material is collagen.

3. A shirred casing stick as claimed in claim 1 wherein the opposing internal surfaces of casing material at an end of said shirred casing stick are joined by heat sealing.

4. A shirred casing stick as claimed in claim 1 wherein the joined edges of casing material in said end closure form an obtuse angle.

5. A shirred casing stick as claimed in claim 1 wherein the joined edges of casing material in said end closure extend diagonally across the width of said tubular casing.

6. A shirred casing stick as claimed in claim 1 wherein the joined edges of casing material in said end closure are arcuate.

7. A shirred casing stick as claimed in claim 1 wherein the joined edges of casing material in said end closure form an internal obtuse angle of about 120° to 150°F. with at least one longitudinal edge of the tubular casing.

8. A shirred casing stick as claimed in claim 1 wherein substantially no casing material extends beyond the joined edges of casing material in said end closure.

9. A method for heat sealing edible, water-insoluble food casing material comprising moisturizing at least a portion of one opposing surface of superimposed plies of edible water-insoluble food casing material to be joined and then imposing heat sealing means with sufficient heat and pressure on the superimposed plies of casing material to join the opposing surfaces thereof together.

10. A method for heat sealing as claimed in claim 9 wherein said superimposed plies of casing material are the walls of a flattened tubular casing.

11. A method for heat sealing as claimed in claim 10 wherein said heat sealing means is imposed across the full width of said flattened tubular food casing obliquely to the longitudinal edges of the tubing.

12. A method for heat sealing as claimed in claim 11 wherein said heat sealing means is imposed diagonally across the full width of said flattened tubular casing.

13. A method for heat sealing as claimed in claim 11 wherein said heat sealing means is arcuate in shape.

14. A method for heat sealing as claimed in claim 11 wherein said heat sealing means is in the shape of an obtuse angle.

15. A method for heat sealing as claimed in claim 9 wherein said edible, water-insoluble casing material is collagen.

16. A method for heat sealing as claimed in claim 15 wherein the casing material to be joined is moisturized to a moisture content of at least about 15% by weight.

17. A method for preparing a shirred casing stick having an end closure comprising the steps of:
   a. providing an edible, water-insoluble tubular collagen casing that is shirred and compressed into a shirred casing stick;
   b. moisturizing tubular casing material from at least one end of said shirred casing stick;
   c. flattening a moisturized end of the tubular casing material; and then
   d. imposing heat sealing means across the full width of flattened tubular casing material obliquely to the longitudinal edges of said tubing using sufficient heat and pressure to join the opposing internal surfaces of said flattened tubular casing together, whereby an end closure is formed in the end of said shirred casing stick that is suitable to block the passage of food emulsion from the end of the same.

18. A method as claimed in claim 17 which comprises the step of severing excess casing material extending beyond the heat sealed end closure formed in the end of the tubular casing material.

19. A method as claimed in claim 17 wherein tubular casing material in said shirred casing stick is moisturized to a moisture content of at least about 15% by weight.

* * * * *